United States Patent
Matsuo

(10) Patent No.: US 9,860,421 B2
(45) Date of Patent: Jan. 2, 2018

(54) INFORMATION PROCESSING APPARATUS, INFORMATION PROCESSING METHOD, AND NON-TRANSITORY COMPUTER READABLE MEDIUM

(71) Applicant: FUJI XEROX CO., LTD., Tokyo (JP)

(72) Inventor: Yoshie Matsuo, Yokohama (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/217,140

(22) Filed: Jul. 22, 2016

(65) Prior Publication Data
US 2017/0280012 A1    Sep. 28, 2017

(30) Foreign Application Priority Data

Mar. 22, 2016    (JP) .................................. 2016-057258

(51) Int. Cl.
| | |
|---|---|
| *G06K 15/02* | (2006.01) |
| *H04N 1/393* | (2006.01) |
| *H04N 1/387* | (2006.01) |
| *H04N 1/60* | (2006.01) |
| *G06F 3/12* | (2006.01) |

(52) U.S. Cl.
CPC .......... *H04N 1/393* (2013.01); *G06F 3/1243* (2013.01); *G06F 3/1257* (2013.01); *H04N 1/3872* (2013.01); *H04N 1/60* (2013.01); *H04N 2201/0082* (2013.01)

(58) Field of Classification Search
CPC ........ H04N 1/393; H04N 1/3872; H04N 1/60; H04N 2201/0082; G06F 3/1243; G06F 3/1257

USPC ......................................................... 358/1.2
See application file for complete search history.

(56) References Cited

U.S. PATENT DOCUMENTS

| | | | |
|---|---|---|---|
| 2004/0234169 A1* | 11/2004 | Tojo ................... | G06K 9/00463 382/305 |
| 2006/0274388 A1* | 12/2006 | Miyazawa ......... | H04N 1/00411 358/527 |
| 2009/0213406 A1* | 8/2009 | Kimura .................. | G06K 15/02 358/1.13 |
| 2011/0140857 A1* | 6/2011 | Hull .................. | G06F 17/30876 340/10.1 |
| 2014/0236978 A1* | 8/2014 | King ................. | G06F 17/30637 707/758 |

(Continued)

FOREIGN PATENT DOCUMENTS

JP    2006-309397 A    11/2006

*Primary Examiner* — Allen H Nguyen
(74) *Attorney, Agent, or Firm* — Oliff PLC

(57) ABSTRACT

There is provided an information processing apparatus. A processing unit receives original document data defining a design of an original document and processes the original document data so as to conform to a completion state of the original document during output. A creating unit creates output data in which the original document based on the processed original document data is disposed in an arrangement region on a recording medium having the original document formed thereon in a case where a ratio of a region of the original document based on the processed original document data to the arrangement region falls within an arrangement limitation, in a case where an amount of processing performed by the processing unit falls within a processing limitation.

12 Claims, 14 Drawing Sheets

(56) References Cited

U.S. PATENT DOCUMENTS

2015/0067484 A1* 3/2015 Sumio ................ G06F 3/04883
715/251

* cited by examiner

FIG. 5

| ORIGINAL DOCUMENT DATA ID | ORIGINAL DOCUMENT SIZE | OBJECT INFORMATION |
|---|---|---|
| 100 x 80_01 | 110mm x 80mm | BACKGROUND IMAGE, IMAGE, TEXT OBJECT |

FIG. 6

| OBJECT NAME | ARRANGEMENT COORDINATES | TEXT VALUE | FONT INFORMATION |
|---|---|---|---|
| TEXT 1 | (8, 10) | 40 | Arial / (R: 230, G: 3, R: 5) / 20pt |
| TEXT 2 | (40, 18) | % | Arial / (R: 230, G: 3, R: 5) / 16pt |
| TEXT 3 | (61, 3) | OFF! | Arial / (R: 230, G: 3, R: 5) / 14pt |
| TEXT 4 | (23, 32) | ★★ XXXX SHOP ★★ | Arial / (R: 230, G: 3, R: 5) / 8pt |

| COMPLETION SETTING ID | COMPLETION SIZE | RESTRICTION CONTENTS 1 | RESTRICTION CONTENTS 2 |
|---|---|---|---|
| 100 x 75_01 | 100mm x 75mm | CONTENTS OF RESTRICTION 1 (COORDINATES OF OBJECT TO BE RESTRICTED AND RESTRICTION CONTENTS) | CONTENTS OF RESTRICTION 2 (COORDINATES OF OBJECT TO BE RESTRICTED AND RESTRICTION CONTENTS) |

| ARRANGEMENT SETTING ID | THE NUMBER OF ARRANGEMENTS | SIZE OF ARRANGEMENT REGION | ARRANGEMENT POINT | SHEET SIZE | MARGIN |
|---|---|---|---|---|---|
| 2 x 4_01 | 2 x 4 | 100mm x 75mm | (10mm, 5mm) | 210mm x 294mm (A4 VERTICAL) | 20mm, 10mm |

INFORMATION PROCESSING APPARATUS, INFORMATION PROCESSING METHOD, AND NON-TRANSITORY COMPUTER READABLE MEDIUM

CROSS-REFERENCE TO RELATED APPLICATIONS

This application is based on and claims priority under 35 USC 119 from Japanese Patent Application No. 2016-057258 filed Mar. 22, 2016.

TECHNICAL FIELD

The present invention relates to an information processing apparatus, information processing method, and a non-transitory computer readable medium.

RELATED ART

A user may select a specific template among plural different templates (design samples) which define a design of a printed matter and may edit the specific template, to thereby create printing data. In general, the printing data is printed by a printing device and is subjected to post-processing such as cutting-out by a post-processing device, thereby creating a final printed matter. Printing data to be created may vary depending on conditions such as a printing device, a post-processing device, and a sheet which are used. For example, since a cutting-out position may vary depending on the type of cutter used in the cutting-out, and a color and a printing range which are appropriate for a sheet to be used may vary depending on the sheet, printing data varying depending on a condition is created.

SUMMARY

According to an aspect of the embodiments of the present invention, there is provided an information processing apparatus comprising: a processing unit that receives original document data defining a design of an original document and processes the original document data so as to conform to a completion state of the original document during output; and a creating unit that creates output data in which the original document based on the processed original document data is disposed in an arrangement region on a recording medium having the original document formed thereon in a case where a ratio of a region of the original document based on the processed original document data to the arrangement region falls within an arrangement limitation, in a case where an amount of processing performed by the processing unit falls within a processing limitation.

BRIEF DESCRIPTION OF THE DRAWINGS

Exemplary embodiments of the present invention will be described in detailed based on the following figures, wherein:

FIG. 5 is a diagram showing a structure of original document data;

FIG. 6 is a diagram showing data of text objects;

FIG. 14 is a diagram showing a structure of arrangement setting data;

DETAILED DESCRIPTION

Figure 1:
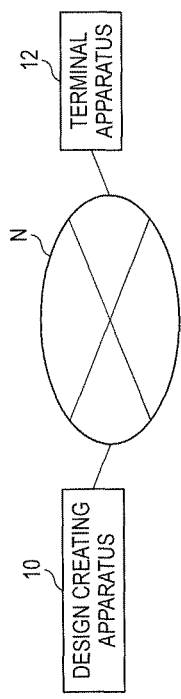
FIG. 1 is a block diagram showing a design creating system according to an exemplary embodiment of the invention.

Now, a design creating system as an information processing system according to an exemplary embodiment of the invention will be described. FIG. 1 shows an example of a design creating system according to this exemplary embodiment. The design creating system includes a design creating apparatus 10 as an information processing apparatus and a terminal device 12. The design creating apparatus 10 and the terminal device 12 are connected to a communication channel N such as a network. In the example shown in FIG. 1, one terminal device 12 is connected to the communication channel N, but plural terminal devices 12 may be connected to the communication channel N.

The design creating apparatus 10 is an apparatus that stores original document data regarding the creation of a design of a printed matter and processes the original document data to thereby create printing data as output data. The printed matter is, for example, a business card, a flyer, an advertisement, a direct mail (DM), a poster, a postcard, a catalog, other documents, or the like. The printing data is printed by a printing device not shown in the drawing and is subjected to postprocessing by a post-processing device, thereby creating a final printed matter. The postprocessing is, for example, cutting-out, folding processing, or binding of a sheet as a recording medium. In addition, the design creating apparatus 10 has a function of transmitting and receiving data to and from another apparatus.

The terminal device 12, which is an apparatus such as a personal computer (PC), a tablet PC, a smartphone, or a mobile phone, has a function of transmitting and receiving data to and from another apparatus. The terminal device 12 is used, for example, at the time of creating a design of a printed matter.

Meanwhile, the terminal device 12 may be embedded in the design creating apparatus 10 so that the design creating apparatus 10 and the terminal device 12 are physically integrated with each other.

Figure 2:
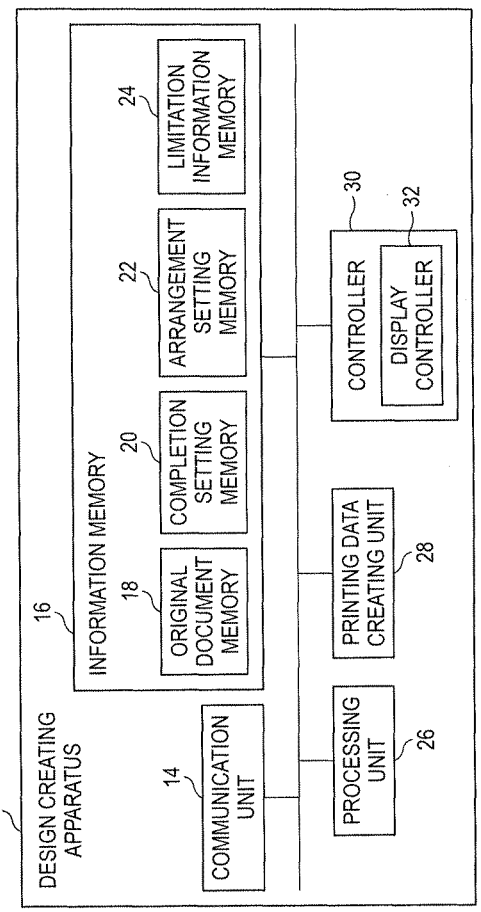
FIG. 2 is a block diagram showing a design creating apparatus according to this exemplary embodiment.

Hereinafter, a configuration of the design creating apparatus 10 will be described in detail with reference to FIG. 2. FIG. 2 shows a configuration of the design creating apparatus 10.

A communication unit 14, which is a communication interface, has a function of transmitting data to another apparatus and a function of receiving data from another apparatus through a communication channel N. For example, data is transmitted and received to and from the terminal device 12 by the communication unit 14.

The information memory 16, which is a storage device such as a hard disk, includes an original document memory 18, a completion setting memory 20, an arrangement setting memory 22, and a limitation information memory 24.

Plural pieces of original document data having different designs are stored in the original document memory 18 in advance. The original document data is data that defines a design of an original document, and is a data as a form of a design. For example, plural pieces of original document data having different designs are created in advance for each type of printed matter and are stored in the original document memory 18. For example, plural pieces of original document data having different designs are created in advance with respect to a business card. The same is true of other printed matters. Each original document data is associated with identification information (for example, a name of an original document, an original document ID, and the like) for identifying the original document data.

The original document data is constituted by, for example, one or plural types of objects (a design item and a design part). For example, the original document data is constituted by a background image object, an image object other than a background image, a text object, and the like. The background image object and the image object are, for example, image data in a bitmap format. The original document data will be described later in detail with reference to FIG. 4.

The completion setting memory 20 stores completion setting data that defines a completion state of an original document during printing (outputting). The completion setting memory 20 stores plural pieces of completion setting data that define different completion states. The completion state is at least one of the size of an original document during printing, the position of an object during printing, the color of an original document during printing, and a folding position of a sheet, and the completion setting data is data that defines these. The original document data is processed so as to conform to a completion state defined by completion setting data, and thus completion data is generated. Hereinafter, an original document indicated by unprocessed original document data will be referred to as an "unprocessed original document", and an original document indicated by processed original document data (completion data) will be referred to as a "processed original document".

The arrangement setting memory 22 stores arrangement setting data (imposition setting data) which defines an arrangement region (drawing region) of a processed original document (original document indicated by completion data) on a sheet. The arrangement region is a region in which a processed original document is disposed on a sheet, and the arrangement setting data is data that defines a layout of a processed original document on a sheet. The arrangement setting memory 22 stores plural pieces of arrangement setting data that define different arrangement regions. The processed original document is disposed in an arrangement region which is defined by arrangement setting data on a sheet, and thus printing data as output data is generated.

The limitation information memory 24 stores processing limitation information indicating a limitation of the amount of processing (the amount of change) of original document data, and arrangement limitation information indicating a limitation of an arrangement setting of a processed original document.

The processing limitation information is information indicating a limitation of the amount of processing (the amount of change) when original document data is processed into a completion state which is defined by completion setting data. The processing limitation information is information for preventing the occurrence of mismatching between an unprocessed original document and a processed original document. The processing limitation information is, for example, a threshold value (ratio threshold value) of a ratio of the size of a processed original document to the size of an unprocessed original document, a threshold value (position change amount threshold value) of the amount of change of the position of an object, a threshold value (color change amount threshold value) of the amount of change of the color of an object, or the like.

The arrangement limitation information is limitation information regarding a ratio (for example, a ratio of an area) of a region of a processed original document (actually drawn processed original document) to an arrangement region (drawing region) on a sheet which is defined by arrangement setting data. The arrangement limitation information is information for preventing the application of an inappropriate arrangement setting. The arrangement limitation information is, for example, information indicating a range of an appropriate ratio which is specified by an upper limit and a lower limit.

The processing unit 26 processes original document data so as to conform to a completion state which is defined by completion setting data. Thereby, completion data is created. For example, specific completion setting data is selected among plural different pieces of completion setting data by a user, and the processing unit 26 processes original document data in accordance with the completion setting data selected by the user. For example, the processing unit 26 changes the size of an original document based on original document data so as to conform to the size of the original document during the output of the original document. In addition, the processing unit 26 changes the position of an object constituting original document data so as to conform to the position of the object during the output of the object. In addition, the processing unit 26 changes the color of an object constituting original document data so as to conform to the color of an original document during the output of the original document. In a case where the amount of processing performed by the processing unit 26 satisfies a limitation of the amount of processing which is indicated by processing limitation information, that is, in a case where the amount of processing falls within the limitation, the processing unit 26 outputs completion data created by processing original document data to a printing data creating unit 28. In a case where the amount of processing performed by the processing unit 26 does not satisfy the limitation of the amount of processing which is indicated by the processing limitation information, that is, in a case where the amount of processing exceeds the limitation, the processing unit 26 discards completion data. In this case, the processing unit 26 outputs information (hereinafter, referred to as "processing amount warning information") which indicates that the amount of processing exceeds the limitation. The processing amount warning information is transmitted to the terminal device 12 through the communication channel N by the communication unit 14 under the control of the controller 30, and is displayed on the terminal device 12.

The printing data creating unit 28 disposes an original document (processed original document) indicated by completion data in an arrangement region (drawing region) which is defined by arrangement setting data. Thereby, printing data is created. For example, specific arrangement setting data is selected among plural different pieces of arrangement setting data by a user, and the printing data creating unit 28 disposes a processed original document in an arrangement region in accordance with the arrangement setting data selected by the user. The printing data creating unit 28 arithmetically operates a ratio of a region of a processed original document to an arrangement region on a sheet. In a case where the ratio satisfies a limitation of a ratio of an original document region indicated by arrangement limitation information, that is, in a case where the ratio of the region falls within a range of an appropriate ratio, the printing data creating unit 28 outputs printing data in which a processed original document is disposed. The printing data is transmitted to the terminal device 12 or a printing device not shown in the drawing, for example, under the control of the controller 30. In the printing device, printing data is printed, and thus a printed matter of an original document is created. In addition, in a case where postprocessing is set, the postprocessing is applied by a post-processing device, and thus a final printed matter is created. In a case where the ratio does not satisfy the limitation of the ratio of the original document region indicated by the arrangement limitation information, that is, in a case where the ratio of the region does not fall within the range of the appropriate ratio, the printing data creating unit 28 discards the printing data. In this case, the printing data creating unit 28 outputs information (hereinafter, referred to as "ratio warning information") which indicates that the ratio exceeds the limitation. The ratio warning information is transmitted to the terminal device 12 through the communication channel N by the communication unit 14 under the control of the controller 30 and is displayed on the terminal device 12.

The controller 30 controls the operation of each unit of the design creating apparatus 10. In addition, the controller 30 includes a display controller 32. The display controller 32 displays various pieces of information on a display device. For example, the display controller 32 displays various pieces of information on the terminal device 12 through the communication channel N.

Figure 3:
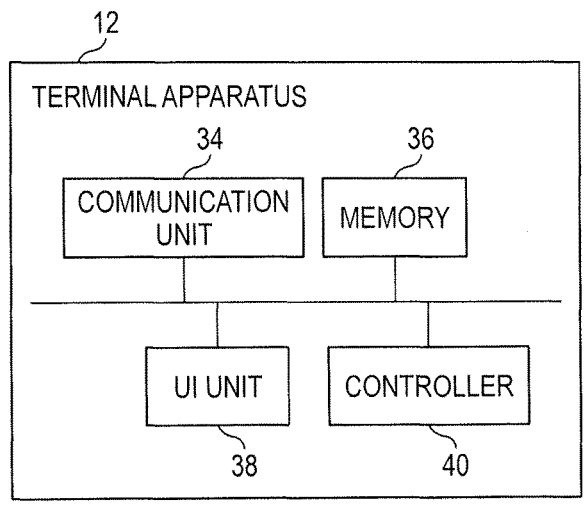
FIG. 3 is a block diagram showing a terminal device.

Hereinafter, the terminal device 12 will be described in detail with reference to FIG. 3. FIG. 3 shows a configuration of the terminal device 12. A communication unit 34, which is a communication interface, has a function of transmitting data to another apparatus and a function of receiving data from another apparatus through the communication channel N. For example, data is transmitted and received to and from the terminal device 12 by the communication unit 34. A memory 36, which is a storage device such as a hard disk, stores programs, data, and the like. A UI unit 38, which is a user interface, includes a display unit and an operation unit. The operation unit is an input device such as a keyboard, a mouse, or a touch panel. The controller 40 controls the operation of each unit of the terminal device 12.

Hereinafter, the design creating apparatus 10 will be described by taking a specific example.

Figure 4:
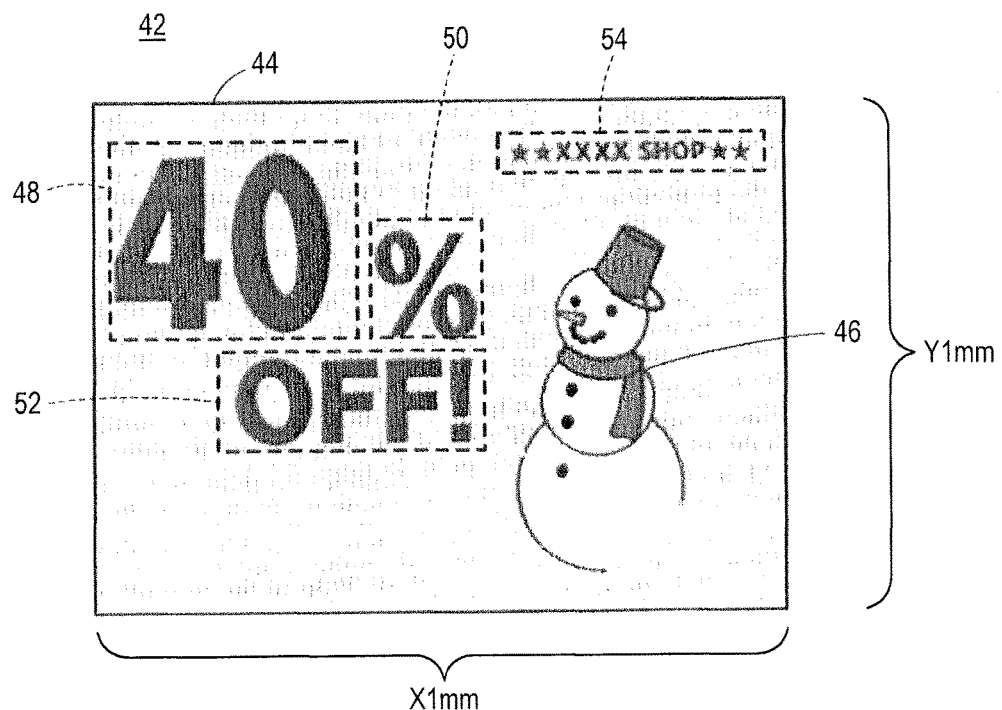
FIG. 4 is a diagram showing original document data.

First, original document data will be described with reference to FIG. 4. FIG. 4 shows an example of original document data. The original document data 42 is constituted by, for example, a background image object 44, an image object 46 other than a background image, and text objects 48, 50, 52, and 54. An original document indicated by the original document data 42 has a rectangular shape, the length of the original document in the X-direction is X1 mm, and the length thereof in the Y-direction is Y1 mm. Plural pieces of original document data are created while varying an object. Thereby, plural pieces of original document data having different objects are created. Plural different pieces of original document data are created for each printed matter. The pieces of original document data are created in advance and are stored in the original document memory 18.

FIG. 5 shows an example of a structure of original document data. The original document data includes, for example, an original document data ID for identifying the original document data, information (X1, Y1) indicating the size of the original document, and information of an object constituting the original document data. In addition, the original document data is associated with data (data of a reduced image) of a thumbnail image of an original document. Data of a thumbnail image with respect to each original document data is created in advance and is stored in the original document memory 18 in advance. Hereinafter, a thumbnail image of an original document will be referred to as a "original document thumbnail image". The original document thumbnail image is associated with an original document data ID.

FIG. 6 shows an example of data of a text object. The data of the text object includes, for example, an object name for identifying the text object, arrangement coordinates (arrangement position) of the text object within the original document data 42, a text value (contents of the text object), and font information indicating the font of the text object. In FIG. 6, "text 1" indicates a text object 48, a "text 2" indicates a text object 50, a "text 3" indicates a text object 52, and a "text 4" indicates a text object 54. Data of a text object is stored in the original document memory 18 in advance.

Figure 7:
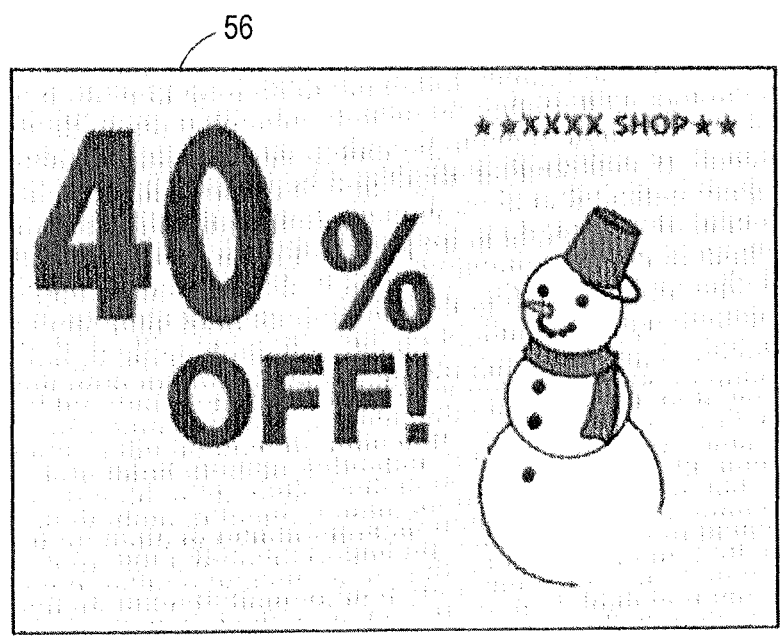
FIG. 7 is a diagram showing a thumbnail image of an original document.

FIG. 7 shows an example of an original document thumbnail image. An original document thumbnail image 56 is a reduced image of the original document data 42. For example, data of the original document thumbnail image 56 is transmitted from the design creating apparatus 10 through the communication channel N to the terminal device 12, and the original document thumbnail image 56 is displayed on the terminal device 12. For example, plural different original document thumbnail images are displayed on the terminal device 12, and a specific original document thumbnail image is selected among the plural original document thumbnail images by a user. Thereby, specific original document data is selected by the user.

Figure 8:
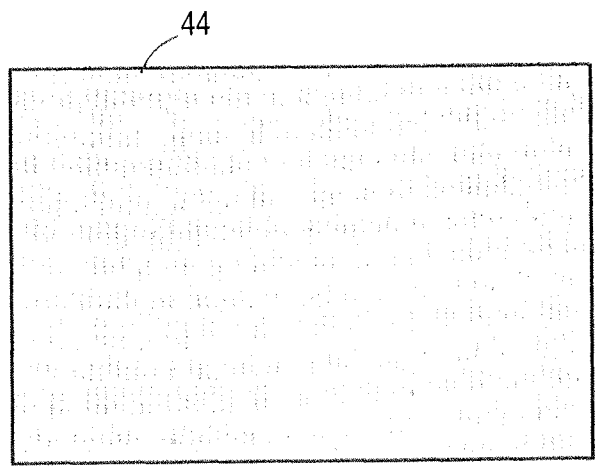
FIG. 8 is a diagram showing a background image object.
Figure 9:
FIG. 9 is a diagram showing an image object.

FIG. 8 shows the background image object 44, and FIG. 9 shows the image object 46.

The background image object 44, the image object 46, and the text objects 48, 50, 52, and 54, which are mentioned above, are synthesized with each other, thereby generating the original document data 42.

Figure 10:
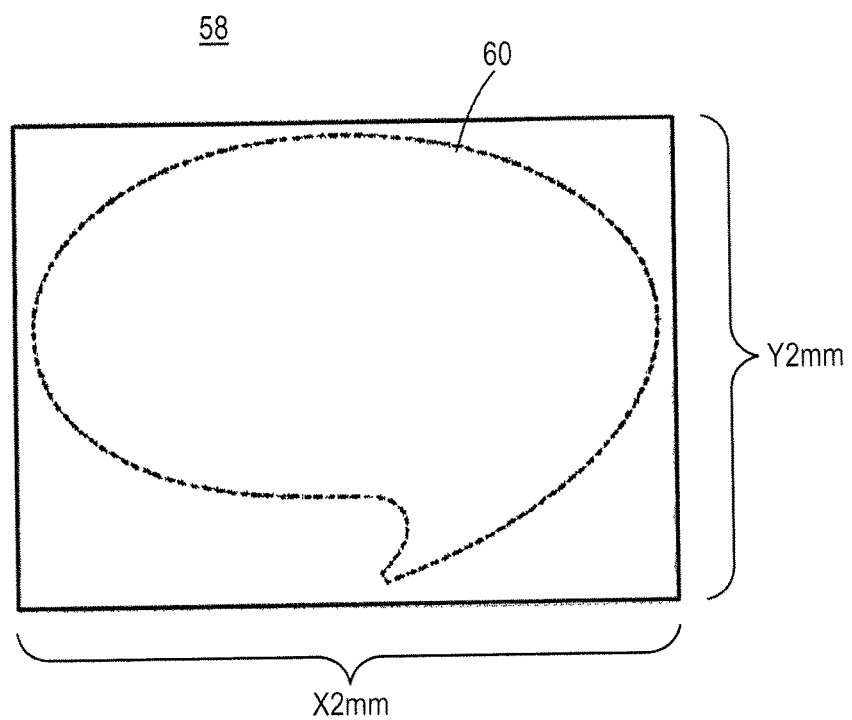
FIG. 10 is a diagram showing completion setting data.

Next, completion setting data will be described with reference to FIG. 10. Completion setting data 58 shown in FIG. 10 is data indicating a completion state of an original document and is, for example, data indicating a completion state in which printing on a dedicated sheet for a balloon point of purchase (POP) advertisement is assumed. The original document in the completion state indicated by the completion setting data 58 has a rectangular shape, the length of the original document in the completion state in the X-direction is X2 mm, and the length thereof in the Y-direction is Y2 mm. A cutout line 60 having a balloon shape is shown in the completion setting data 58. The completion setting data 58 is data indicating a completion state in which printing on a dedicated sheet having perforations corresponding to the cutout line 60 formed therein is assumed. In the completion setting data 58, the arrangement of a text object in an external region of the cutout line 60 is prohibited, and the color of an object on the cutout line 60 is restricted. Plural different pieces of completion setting data are created in advance for each printed matter and are stored in the completion setting memory 20 in advance.

Figures 11, 12:
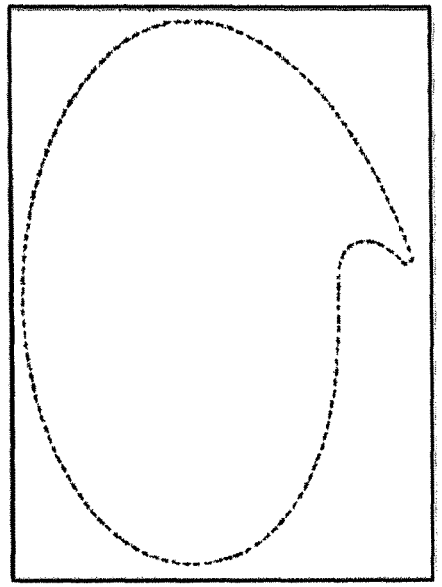
FIG. 11 is a diagram showing a structure of completion setting data.
FIG. 12 is a diagram showing a thumbnail image showing a completion state.

FIG. 11 shows an example of a structure of completion setting data. The completion setting data includes, for example, a completion setting ID for identifying the completion setting data, information (X2, Y2) indicating a completion size of an original document, and information indicating restriction contents. The completion size is the size of an original document after printing. The restriction contents are contents of a completion setting. In the example shown in FIG. 11, contents of the completion setting data 58 are shown. Here, "restriction contents 1" is information indicating that the arrangement of a text object in an external region of the cutout line 60 is prohibited, and is information including coordinates of the cutout line 60 and prohibition contents. In addition, "restriction contents 2" is information indicating the restriction of color of an object on the cutout line 60, and is information including coordinates of the cutout line 60 and prohibition contents.

In addition, the completion setting data is associated with data of a thumbnail image indicating a completion state. Data of a thumbnail image with respect to each completion setting data is created in advance and is stored in the completion setting memory 20 in advance. Hereinafter, a thumbnail image indicating a completion state will be referred to as a "completion state thumbnail image". The completion state thumbnail image is associated with a completion setting ID.

FIG. 12 shows an example of a completion state thumbnail image. A completion state thumbnail image 62 is a reduced image indicating an original document in a completion state which is defined by the completion setting data 58. For example, data of the completion state thumbnail image 62 is transmitted from the design creating apparatus 10 through the communication channel N to the terminal device 12, and the completion state thumbnail image 62 is displayed on the terminal device 12. For example, plural different completion state thumbnail images are displayed on the terminal device 12, and a specific completion state thumbnail image is selected among the plural completion state thumbnail images by a user. Thereby, a specific completion setting is selected by the user.

For example, the original document data 42 is processed so as to conform to a completion state defined by the completion setting data 58, and thus completion data (data indicating processed original document data) is generated.

Figure 13:
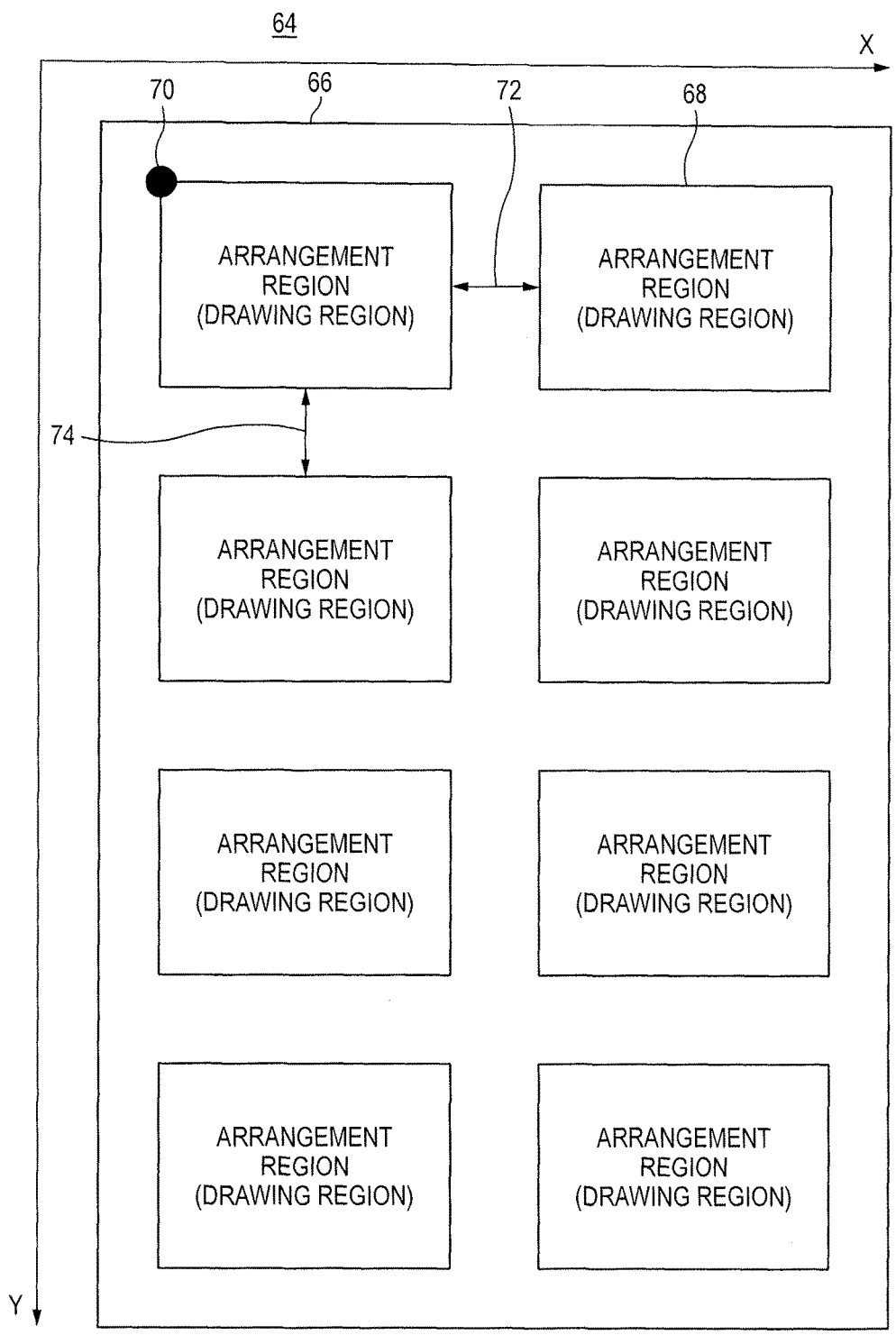
FIG. 13 is a diagram showing arrangement setting data.

Next, arrangement setting data (imposition setting data) will be described with reference to FIG. 13. An arrangement region (drawing region) 68 of a processed original document (original document indicated by completion setting data) with respect to a sheet region 66 is defined in arrangement setting data 64. The arrangement region 68 is a region in which a processed original document is disposed (drawn) on the sheet region 66. In the example shown in FIG. 13, eight arrangement regions 68 are defined by the arrangement setting data 64. The position of each arrangement region 68 is specified by an arrangement point 70 (arrangement coordinates), an X-direction margin 72, and a Y-direction margin 74. The arrangement point 70 is equivalent to, for example, a starting point of the arrangement region 68. The X-direction margin 72 is a distance in the X-direction between the arrangement regions 68 adjacent to each other, and the Y-direction margin 74 is a distance in the Y-direction between the arrangement regions 68 adjacent to each other. Plural pieces of arrangement setting data defining different arrangement regions are created in advance and are stored in the arrangement setting memory 22 in advance. A processed original document indicated by completion data is disposed in the arrangement region 68 which is defined by the arrangement setting data 64, and thus printing data is generated.

FIG. 14 shows an example of a structure of arrangement setting data. The arrangement setting data includes, for example, an arrangement setting ID for identifying the arrangement setting data, information indicating the number of arrangements of processed original documents, information indicating the size (the length in the X-direction, the length in the Y-direction) of the arrangement region 68, coordinates (X, Y) of the arrangement point 70, information indicating a sheet size (the length in the X-direction, the length in the Y-direction), and information indicating a margin (an X-direction margin, a Y-direction margin).

In addition, the arrangement setting data is associated with data of a thumbnail image indicating an arrangement region. Data of a thumbnail image with respect to each arrangement setting data is created in advance and is stored in the arrangement setting memory 22 in advance. Hereinafter, a thumbnail image indicating an arrangement region will be referred to as an "arrangement region thumbnail image". The arrangement region thumbnail image is associated with an arrangement setting ID.

Figure 15:
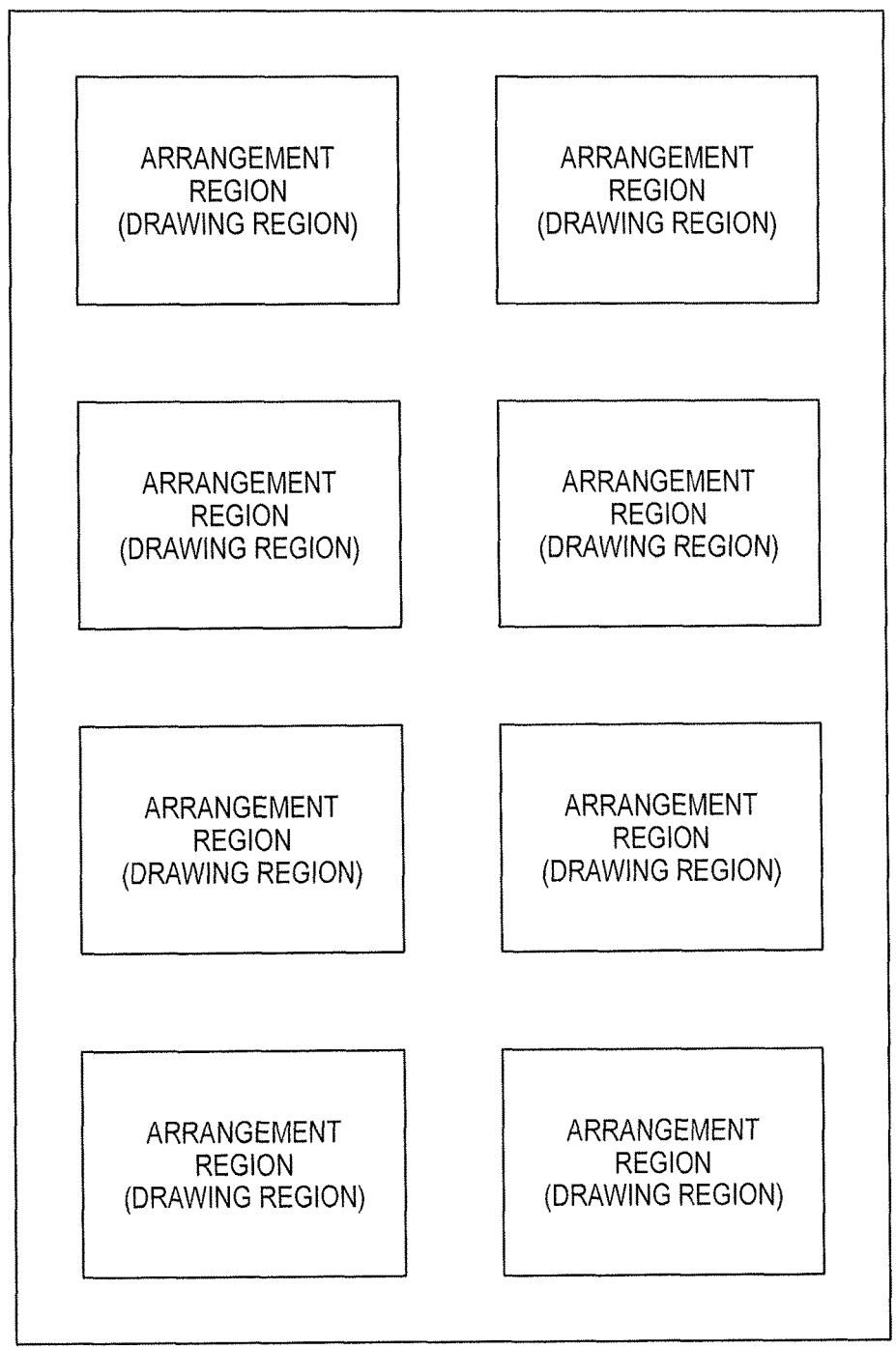
FIG. 15 is a diagram showing a thumbnail image indicating an arrangement region.

FIG. 15 shows an example of an arrangement region thumbnail image. An arrangement region thumbnail image 76 is a reduced image indicating an arrangement region which is defined by arrangement setting data. For example, data of the arrangement region thumbnail image 76 is transmitted from the design creating apparatus 10 through the communication channel N to the terminal device 12, and the arrangement region thumbnail image 76 is displayed on the terminal device 12. For example, plural different arrangement region thumbnail images are displayed on the terminal device 12, and a specific arrangement region thumbnail image is selected among the plural arrangement region thumbnail images by a user. Thereby, a specific arrangement setting is selected by the user.

Figure 16:
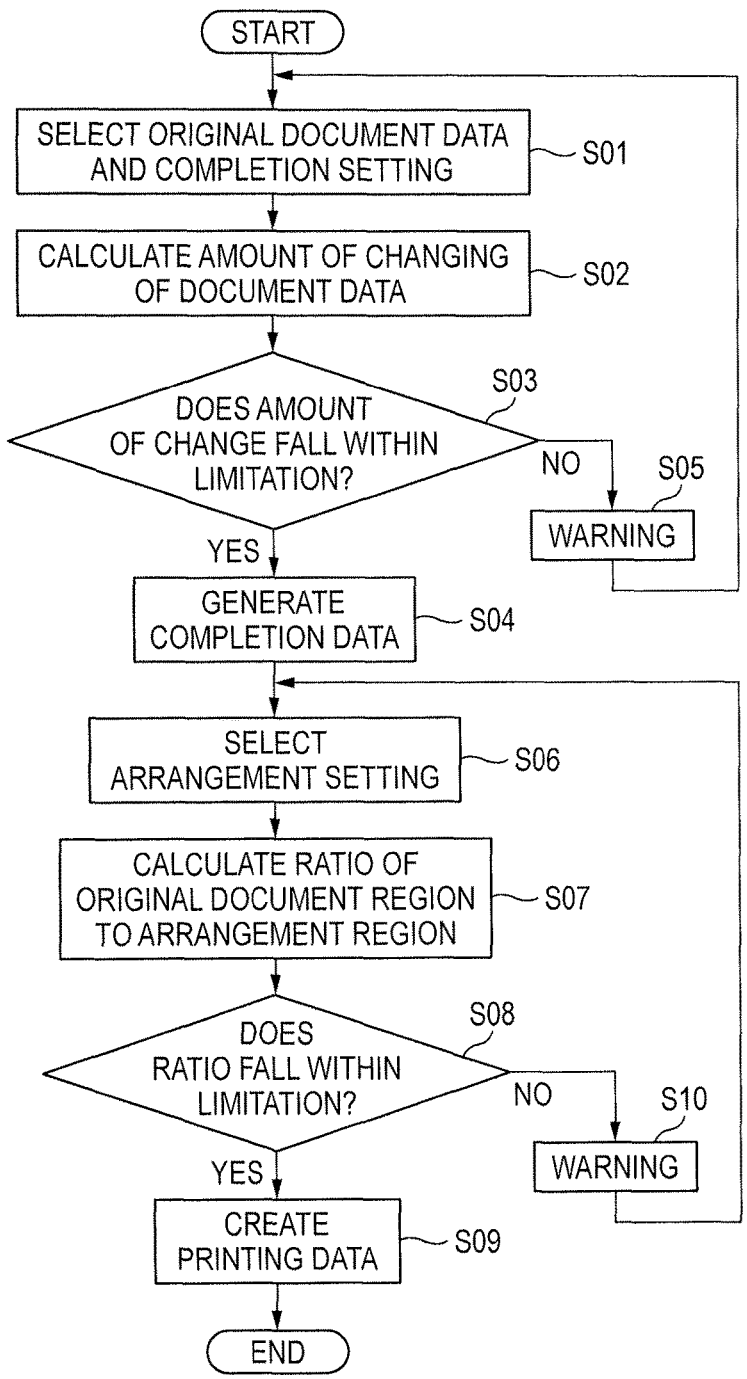
FIG. 16 is a flow chart showing a printing data creating process.

Hereinafter, a printing data creating process will be described in detail with reference to FIG. 16. FIG. 16 shows a flow chart indicating the process.

First, a user has access to the design creating apparatus 10 using the terminal device 12. Thereby, plural original document thumbnail images and plural completion state thumbnail images are displayed on the terminal device 12. The user selects a target original document thumbnail image among the plural original document thumbnail images, and selects a target completion state thumbnail image among the plural completion state thumbnail images. Thereby, target original document data and a completion setting are selected by the user (S01). An original document data ID for identifying the original document data selected by the user and a completion setting ID for identifying the completion setting are transmitted from the terminal device 12 through the communication channel N to the design creating apparatus 10. For example, it is assumed that the original document data 42 shown in FIG. 4 and the completion setting data 58 shown in FIG. 10 are selected by a user.

Next, the processing unit 26 calculates the amount of change (the amount of processing) of the original document data 42 in a case where the original document data 42 is processed so as to conform to a completion state defined by the completion setting data 58 (S02). In a case where the amount of change falls within a processing limitation indicated by processing limitation information (S03, Yes), the processing unit 26 processes the original document data 42 to thereby generate completion data (S04).

In a case where the amount of change falls within the limitation, the completion state defined by the completion setting data 58 is equivalent to a completion state which is appropriate to the original document data 42. In other words, the amount of change falling within the limitation means that an appropriate combination of original document data and completion setting data is selected by a user. The amount of change falling within the limitation means that the amount of change in the original document data 42 is relatively small, in other words, the amount of change in an impression (taste) aroused by the original document data 42 is relatively small. Therefore, a combination of the original document data 42 and the completion setting data 58 in which the amount of change falls within the limitation is used, thereby creating completion data conforming to a completion state while maintaining an impression aroused by the original document data 42.

On the other hand, in a case where the amount of change exceeds a processing limitation indicated by processing limitation information (S03, No), the processing unit 26 outputs processing amount warning information (S05). The processing amount warning information is transmitted to the terminal device 12 through the communication channel N by the communication unit 14 and is displayed on the terminal device 12. In addition, the process returns to step S01. In step S01, with respect to at least one of original document data and completion setting data, data which is different from data which is previously selected is selected by a user. For example, original document data other than the original document data 42 may be selected by a user, completion setting data other than the completion setting data 58 may be selected by a user, or another data may be selected by a user with respect to both the original document data 42 and the completion setting data 58. The process of step S02 and the subsequent processes are performed on data which is newly selected by a user.

In a case where the amount of change exceeds the limitation, completion state defined by the completion setting data 58 is equivalent to a completion state which is inappropriate to the original document data 42. In other words, the amount of change exceeding the limitation means that an inappropriate combination of original document data and completion setting data is selected by a user. The amount of change exceeding the limitation means that the amount of change in the original document data 42 is relatively large, in other words, the amount of change in an impression (taste) aroused by the original document data 42 is relatively large. Therefore, in a case where a combination of the original document data 42 and the completion setting data 58 in which the amount of change exceeds the limitation is used, completion data maintaining an impression aroused by the original document data 42 may not be created. In this case, the processing unit 26 outputs processing amount warning information so that another original document data or completion setting data is selected by a user.

Hereinafter, the processes of steps S02 to S05 will be described in detail.

First, the processing unit 26 calculates a magnification rate or a reduction rate at the time of performing enlargement or reduction while maintaining an aspect ratio of the original document data 42 so as to conform to a completion size which is defined by the completion setting data 58. Specifically, the processing unit 26 calculates a ratio of the completion size (X2) to the size (X1) of the original document and a ratio of the completion size (Y2) to the size (Y1) of the original document, and adopts any ratio having a larger value. In a case where the ratio is equal to or less than a ratio threshold value as processing limitation information, the processing unit 26 enlarges or reduces the original document data 42 so as to conform to a completion size. On the other hand, in a case where the ratio exceeds the ratio threshold value, the processing unit 26 outputs processing amount warning information. In this case, the process returns to step S01. The ratio threshold value may be a value which is set in advance or may be changed by a user. The ratio being equal to or less than the ratio threshold value means that the amount of change in an impression aroused by the original document data 42 is relatively small, and a case where the ratio exceeds the ratio threshold value means that the amount of change in an impression aroused by the original document data 42 is relatively large.

In a case where the above-mentioned ratio is equal to or less than the ratio threshold value, the processing unit 26 calculates the amount of change in the position of each object for making an arrangement position of an object fall within a limitation in the original document data 42 which is enlarged or reduced. Specifically, the processing unit 26 calculates the amounts of movement of the text objects 48, 50, 52, and 54 for disposing the text objects 48, 50, 52, and 54 included in the original document data 42 within a region surrounded by the cutout line 60, that is, the amounts of change in position in the original document data 42 which is enlarged or reduced, in accordance with the "restriction contents 1". In a case where the amounts of movement (the amount of change in position) are equal to or less than a position change amount threshold value as processing limitation information, the processing unit 26 moves the text objects 48, 50, 52, and 54 to the inside of the region surrounded by the cutout line 60. On the other hand, in a case where the amount of movement exceeds a position change amount threshold value, the processing unit 26 outputs processing amount warning information and discards the original document data 42 which is enlarged or reduced. In this case, the process returns to step S01. The position change amount threshold value may be a value which is set in advance or may be changed by a user. The amount of movement being equal to or less than the position change amount threshold value means that the amount of change in an impression aroused by the original document data 42 is relatively small, and the amount of movement exceeding the position change amount threshold value means that the amount of change in an impression aroused by the original document data 42 is relatively large.

In a case where the amount of movement is equal to or less than the position change amount threshold value, the processing unit 26 calculates the amount of change in the color of each object for making the color of an object fall within a limitation in the original document data 42 which is enlarged or reduced. Specifically, the processing unit 26 calculates the amount of change in the color of each object for preventing the color of each object on the cutout line 60 from being included in a specific color range in the original document data 42 which is enlarged or reduced, in accordance with "restriction contents 2".

Regarding the specific color range, as an example, the value of a color component R (red) is in a range of 86 to 238, the value of a color component G (green) is in a range of 194 to 255, and the value of a color component B (blue) is in a range of 214 to 221. For example, in a case where the value of the color component R (red) of an object on the cutout line 60 is in a range of 86 to 238, the value of the color component G (green) is in a range of 194 to 255, and the value of the color component B (blue) is in a range of 214 to 221, the processing unit 26 calculates the amount of change for changing the color of an object on the cutout line 60 to a color included in a range other than the above-mentioned specific color range. Meanwhile, the above-mentioned specific color range is just an example, and may vary depending on a printing device, sheet, toner, ink, or the like which is used.

For example, the processing unit 26 calculates the amount of change for changing the value of a color component R (red) of an object to a value (for example, 80 or 240) which falls outside a range of 86 to 238. At this time, the processing unit 26 calculates the amount of change for changing the color component R (red) of the object to a value which falls outside a specific color range (86 to 238) and minimizes a difference from the value of the color component R (red) of the object. For example, in a case where the value of the color component R (red) of the object is "90", the amount of change is "10 (=90−80)". Similarly, the processing unit 26 calculates the amount of change for changing the value of the color component R (red) of the object to a value (for example, 190 or 260) which falls outside a range of 194 to 255. At this time, the processing unit 26 calculates the amount of change for changing a color component G (green) of an object to a value which falls outside a specific color range (194 to 255) and minimizes a different from the value of the color component G (green) of the object. Similarly, the processing unit 26 calculates the amount of change for changing the value of a color component B (blue) of an object to a value (for example, 210 or 225) which falls outside a range of 214 to 221. At this time, the processing unit 26 calculates the amount of change for changing the color component B (blue) of the object to a value which falls outside a specific color range (214 to 221) and minimizes a different from the value of the color component B (blue) of the object.

In a case where the amount of change in color, for example, all of the amounts of change in three colors are equal to or less than a color change amount threshold value as processing limitation information, the processing unit 26 changes the color of an object on the cutout line 60 to a color included in a range other than a specific color range. On the other hand, in a case where the amount of change in color, for example, the amount of change in at least one color exceeds the color change amount threshold value, the processing unit 26 outputs processing amount warning information, and discards the original document data 42 which is enlarged or reduced. In this case, the process returns to step S01. The color change amount threshold value may be a value which is set in advance, or may be changed by a user. The amount of change in the color being equal to or less than the color change amount threshold value means that the amount of change in an impression aroused by the original document data 42 is relatively small, and the amount of change in color exceeding the color change amount threshold value means that the amount of change in an impression aroused by the original document data 42 is relatively large. Meanwhile, the processing unit 26 may output processing amount warning information in a case where all of the amounts of change in three colors exceed a color change amount threshold value, and may change the color of an object on the cutout line 60 to a color included in a range other than a specific color range in a case where the amount of change in at least one color is equal to or less than the color change amount threshold value.

Perforations corresponding to the cutout line 60 are formed in advance in a sheet on which an original document having a completion state defined by the completion setting data 58 is printed. When an original document having a color included in the above-mentioned specific color range is printed on the perforations in the sheet, a blue color is not likely to be reproduced in a perforation portion and the peripheral portion thereof, which may result in, for example, decoloration, color bleeding, or the like. In order to cope with this, in this exemplary embodiment, in a case where the color of an object disposed on the cutout line 60 is included in the above-mentioned specific color range, the processing unit 26 changes the color of the object to a color that does not fall within the specific color range. In a case where the amount of change in the color is equal to or less than the color change amount threshold value, an impression aroused by the original document data 42 is maintained while preventing or suppressing the occurrence of decoloration, color bleeding, or the like on the perforations.

In addition, in a case where a folding position of a sheet is set as a completion setting, the processing unit 26 calculates the amount of movement in each object for disposing each object at a position other than the folding position of the sheet, that is, the amount of change in position in the original document data 42 which is enlarged or reduced. In a case where the amount of movement (the amount of change in position) is equal to or less than the position change amount threshold value as processing limitation information, the processing unit 26 moves each object to a position other than the folding position. On the other hand, in a case where the amount of movement exceeds a position change amount threshold value, the processing unit 26 outputs processing amount warning information and discards the original document data 42 which is enlarged or reduced. In this case, the process returns to step S01. The amount of movement being equal to or less than the position change amount threshold value means that the amount of change in an impression aroused by the original document data 42 is relatively small, and the amount of movement exceeding the position change amount threshold value means that the amount of change in an impression aroused by the original document data 42 is relatively large.

Figure 17:
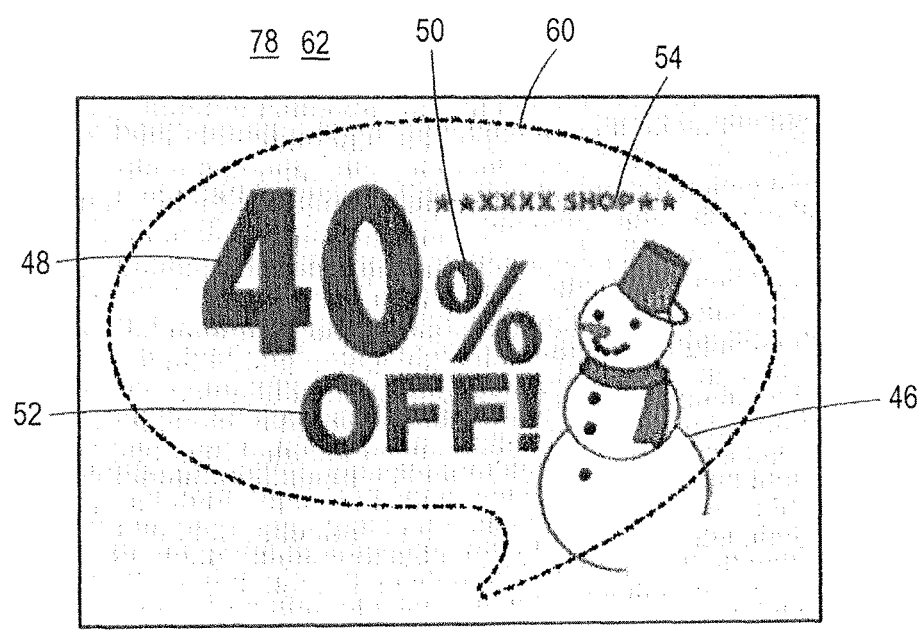
FIG. 17 is a diagram showing completion data.

As described above, in a case where the amount of change in the original document data 42 falls within a processing limitation, completion data is created by processing the original document data 42. FIG. 17 shows an example of completion data. In completion data 78, text objects 48, 50, 52, and 54 are disposed within a region surrounded by a cutout line 60. In other words, the text objects 48, 50, 52, and 54 are moved so that the text objects 48, 50, 52, and 54 included in the original document data 42 fall within the region surrounded by the cutout line 60.

Next, plural arrangement region thumbnail images are displayed on the terminal device 12. A user selects a target arrangement region thumbnail image among the plural arrangement region thumbnail images. Thereby, a target arrangement setting is selected by the user (S06). An arrangement setting ID for identifying the arrangement setting selected by the user is transmitted from the terminal device 12 through the communication channel N to the design creating apparatus 10. For example, it is assumed that the arrangement setting data 64 shown in FIG. 13 is selected by a user.

Next, the printing data creating unit 28 calculates a ratio of a region of a processed original document (original document indicated by completion data) to the arrangement region 68 on the sheet region 66 defined by the arrangement setting data 64 (S07).

In a case where the ratio (ratio of an area) of the region of the processed original document to the arrangement region 68 falls within a range of an appropriate ratio (appropriate area ratio) which is indicated by arrangement limitation information (S08, Yes), the printing data creating unit 28 disposes an original document (processed original document) indicated by completion data in the arrangement region (drawing region) 68 defined by the arrangement setting data 64, thereby creating printing data (S09). In other words, in a case where the ratio of the area is equivalent to a value between an upper limit and a lower limit of the range of the appropriate area ratio, the printing data creating unit 28 creates printing data.

In a case where the ratio of the area falls within range of the appropriate area ratio, the arrangement region 68 defined by the arrangement setting data 64 is equivalent to an arrangement region which is appropriate to completion data. In other words, the ratio of the area falling within the range of the appropriate area ratio means that arrangement setting data which is appropriate in a relationship with completion data is selected by a user. In detail, in a case where the ratio of the area falls within the range of the appropriate area ratio, the size of the arrangement region 68 is not excessively smaller than and is not excessively larger than the size of the processed original document. A case where the size of the arrangement region 68 is excessively smaller than the size of the processed original document, that is, a case where the ratio of the area of the processed original document to the arrangement region 68 exceeds an upper limit of the range of the appropriate area ratio may result in a problem that a portion of the processed original document is not printed on a sheet. On the other hand, a case where the size of the arrangement region 68 is excessively larger than the size of the processed original document, that is, a case where the ratio of the area of the processed original document to the arrangement region 68 is less than a lower limit of the range of the appropriate area ratio may result in a problem that the ratio of the region in which the processed original document is not printed on the sheet increases, as compared to a case where the ratio of the area falls within the range of the appropriate area ratio. In other words, a useless region becomes larger. In a case where the ratio of the area falls within the range of the appropriate area ratio, the above-mentioned problem is avoided.

On the other hand, in a case where the ratio of the region (ratio of the area) does not fall within the range of the appropriate ratio (appropriate area ratio) (S08, No), the printing data creating unit 28 outputs ratio warning information (S10). For example, in a case where the ratio of the area exceeds an upper limit of the range of the appropriate area ratio or is less than a lower limit of the range, the printing data creating unit 28 outputs ratio warning information. The ratio warning information is transmitted to the terminal device 12 through the communication channel N by the communication unit 14 and is displayed on the terminal device 12. In addition, the process returns to step S06. In step S06, arrangement setting data which is different from the arrangement setting data 64 is selected by a user, and the process of step S06 and the subsequent processes are performed on the arrangement setting data which is newly selected by the user.

Figure 18:
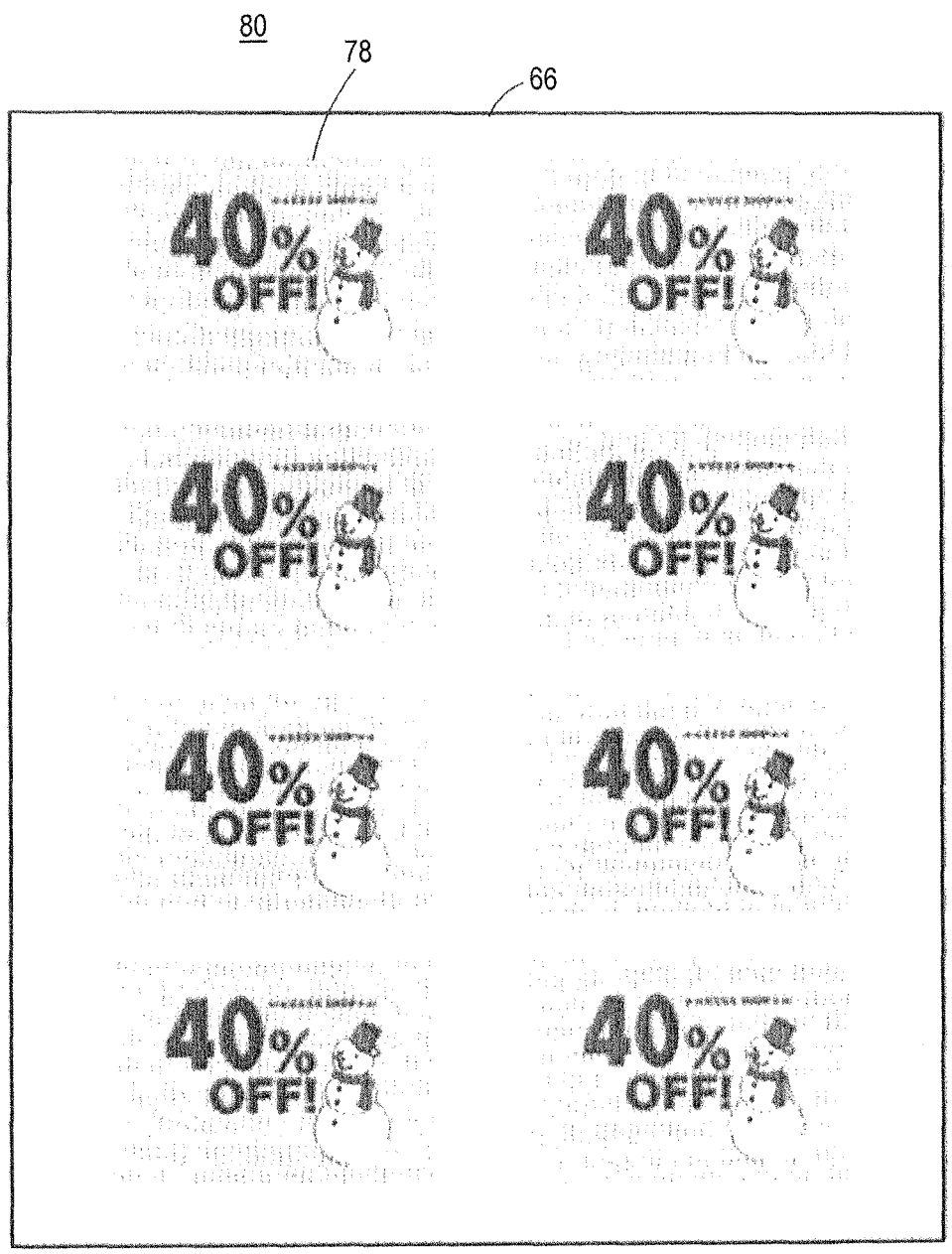
FIG. 18 is a diagram showing printing data.

FIG. 18 shows an example of printing data. In printing data 80, completion data 78 is disposed in each arrangement region 68 on a sheet region 66. For example, the printing data 80 is transmitted to the terminal device 12 through the communication channel N. In addition, the printing data 80 is transmitted to a printing device and is printed by the printing device. Thereby, a printed matter is created. Thereafter, in a post-processing device, the printed matter is cut out along a cutout line 60, and thus a final printed matter is created.

As described above, according to this exemplary embodiment, in a case where a completion setting exceeding a processing limitation is selected by a user, a warning is issued, thereby preventing the creation of completion data within the processing limitation, that is, completion data in which a design (impression (taste) aroused by original document data) of original document data is not maintained. In a case where the completion setting within the processing limitation is selected by the user, completion data within the processing limitation is created. In other words, as compared to the completion data exceeding the processing limitation, completion data having a small difference from a design of original document data which is selected by the user is created. When the user selects target original document data among plural pieces of original document data and selects a target completion setting among plural completion settings, completion data having a design of original document data maintained while having a target completion state is created. The user does not need to determine whether or not the completion setting falls within the processing limitation, that is, whether or not a design of original document data is maintained by the completion setting selected by the user.

In addition, in a case where an arrangement setting exceeding an arrangement limitation is selected by a user, a warning is issued, thereby preventing printing data exceeding the arrangement limitation from being created. In a case where an arrangement setting falling within the arrangement limitation is selected by a user, printing data falling within the arrangement limitation is created. Thereby, as compared to printing data exceeding the arrangement limitation, printing data having an arrangement setting appropriate to completion data is created. In other words, it is possible to avoid a problem that a portion of a processed original document is not printed on a sheet due to an excessive large ratio of the area of the processed original document to an arrangement region. In addition, it is possible to avoid a problem such as an increase in a ratio of a region in which a processed original document is not printed on a sheet due to an excessive small ratio of the area of the processed original document to the arrangement region. When a user selects a target arrangement setting among plural arrangement settings, an arrangement setting appropriate to a processed original document indicated by completion data, that is, an arrangement setting which is not excessively small and is not excessively large for the processed original document is selected, thereby generating printing data in which the processed original document is appropriately disposed. The user does not need to determine whether or not the arrangement setting falls within the arrangement limitation.

According to this exemplary embodiment, it is possible to create printing data which is appropriate to a completion state of an original document during printing and satisfies an arrangement limitation of the original document with respect to a sheet while maintaining a design defined by original document data, without preparing in advance printing data satisfying a limitation of all conditions (all of original document data, a completion setting, and an arrangement setting), in consideration of the conditions.

Modification Example

Figure 19:
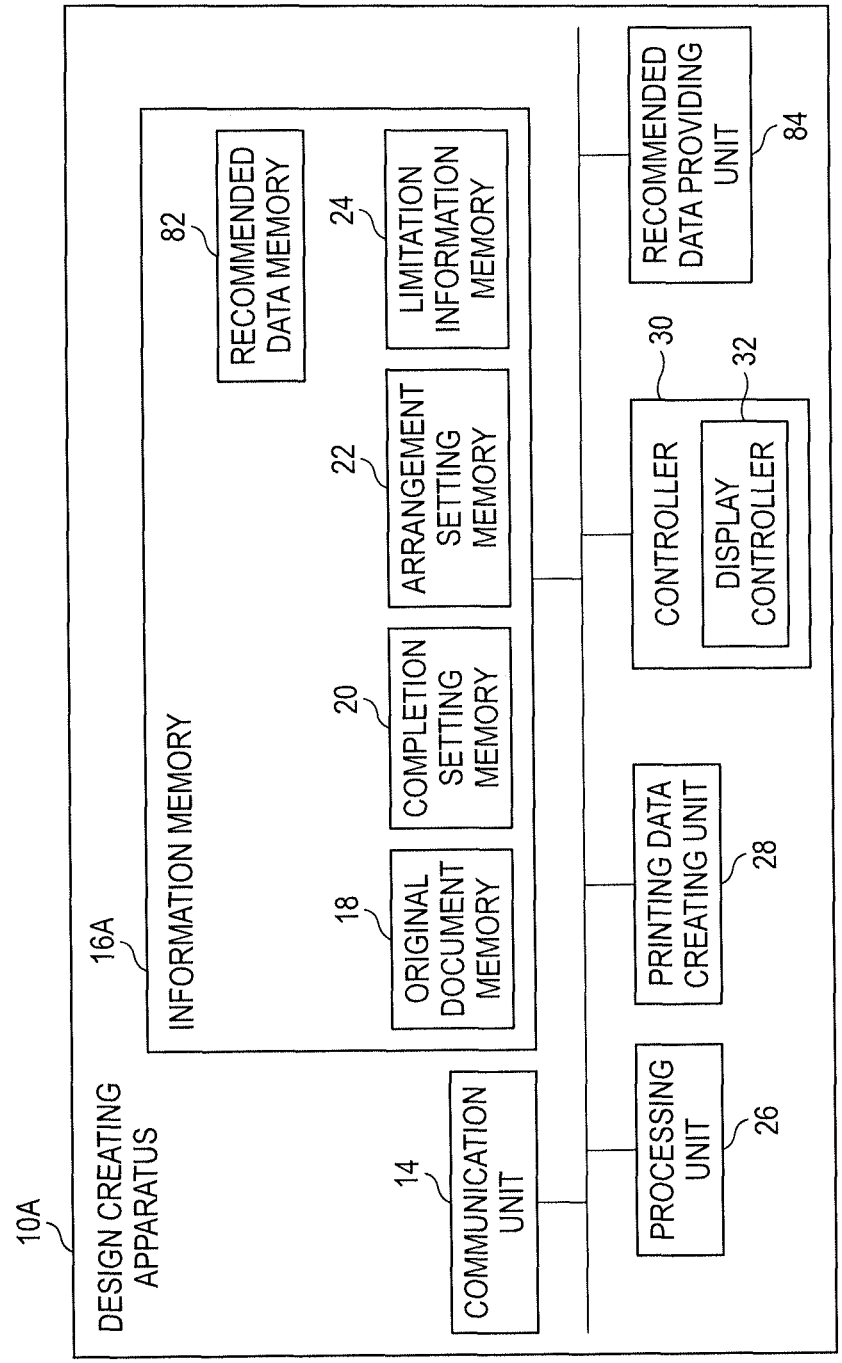
FIG. 19 is a block diagram showing a design creating apparatus according to a modification example.

Hereinafter, a design creating apparatus according to a modification example will be described. FIG. 19 shows a design creating apparatus 10A according to the modification example. The design creating apparatus 10A includes an information memory 16A instead of the information memory 16, and further includes a recommended data providing unit 84. The information memory 16A includes a recommended data memory 82. Configurations other than the recommended data memory 82 and the recommended data providing unit 84 are the same as the configurations of the design creating apparatus 10 according to the above-described exemplary embodiment.

Original document data, completion setting data that defines a completion state within a processing limitation with respect to the original document data, and arrangement setting data that defines an arrangement region within an arrangement limitation with respect to completion data created in accordance with the completion setting data are stored as a combination in the recommended data memory 82 for each original document data in association with each other.

The recommended data providing unit 84 provides at least one thumbnail image group of a thumbnail image group of original document data (original document thumbnail image group), a thumbnail image group of completion data (completion state thumbnail image group), and a thumbnail image group of arrangement setting data (arrangement region thumbnail image group) to a terminal device 12. Data of the thumbnail image group is transmitted to the terminal device 12 through a communication channel N, and the thumbnail image group is displayed on the terminal device 12.

In the terminal device 12, a target thumbnail image is selected among the thumbnail image groups by a user. Thereby, any of the original document data, the completion data, and the arrangement setting data is selected by the user. A processing unit 26 processes the original document data included in a combination including the data selected by the user to thereby create completion data in accordance with the completion setting data included in the combination. A printing data creating unit 28 disposes an original document based on the completion data in an arrangement region to thereby create printing data in accordance with the arrangement setting data included in the combination.

Hereinafter, a first modification example will be described in detail.

Figure 20:
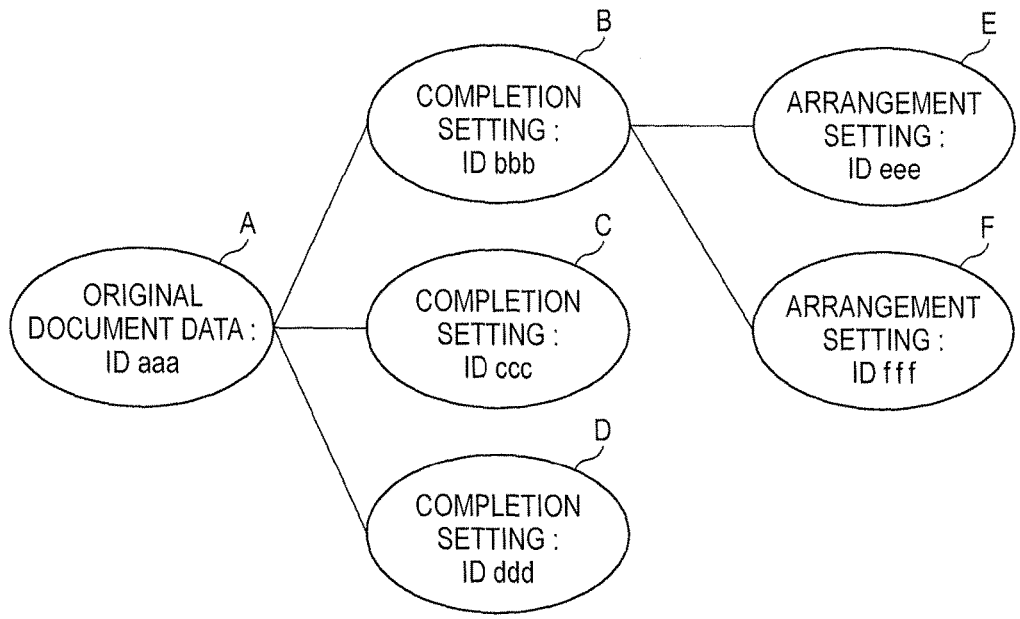
FIG. 20 is a diagram showing association between original document data, completion setting data, and arrangement setting data.

First, association of original document data, completion setting data, and arrangement setting data will be described with reference to FIG. 20. FIG. 20 shows the association.

Completion setting data B (ID: bbb), completion setting data C (ID: ccc), and completion setting data D (ID: ddd) are associated with original document data A (ID: aaa). In other words, the pieces of completion setting data B, C, and D are pieces of data that define a completion state within a processing limitation in a relationship with the original document data A.

Arrangement setting data E (ID: eee) and arrangement setting data F (ID: fff) are associated with the completion setting data B. In other words, pieces of arrangement setting data E and F are pieces of data that define an arrangement region within an arrangement limitation in a relationship with completion data which is obtained by applying the completion setting data B to the original document data A.

One data is selected among original document data, completion setting data, and arrangement setting data, thereby specifying data which is associated with the selected data.

Figure 21:
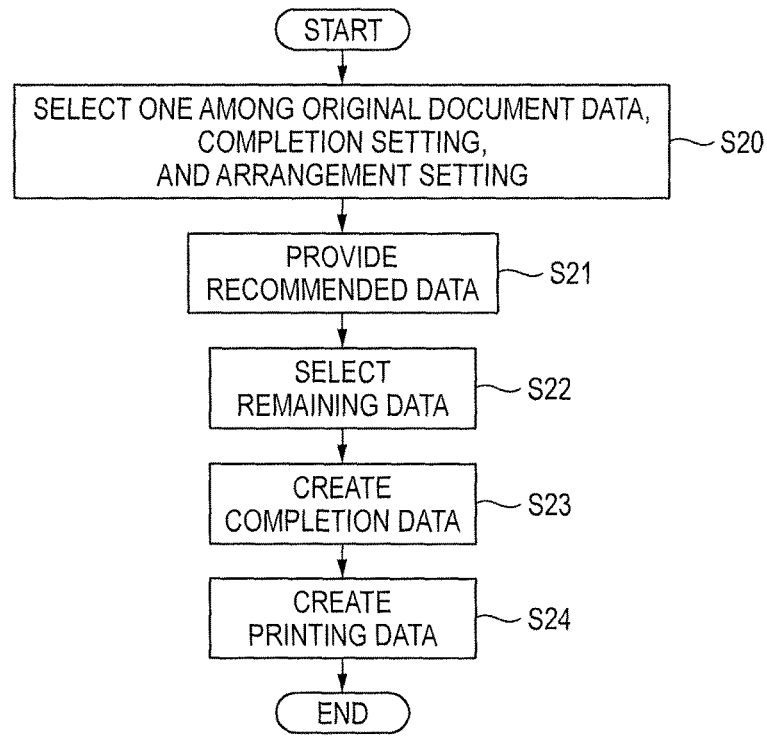
FIG. 21 is a flow chart showing a process according to a modification example.

Hereinafter, a process according to the modification example will be described in detail with reference to FIG. 21. FIG. 21 shows a flow chart indicating the process.

First, a user has access to the design creating apparatus 10 using the terminal device 12. Thereby, at least one thumbnail group selected among the original document thumbnail image group, the completion state thumbnail image group, and the arrangement region thumbnail image group is displayed on the terminal device 12. For example, a thumbnail image group selected by the user is displayed on the terminal device 12. In a case where a design of an original document is set as a starting point, the original document thumbnail image group is displayed on the terminal device 12. In a case where a completion state is set as a starting point, the completion state thumbnail image group is displayed on the terminal device 12. In a case where the arrangement of an original document is set as a starting point, the arrangement region thumbnail image is displayed on the terminal device 12.

A user selects a target thumbnail image in any thumbnail image group. Thereby, one is selected among original document data, a completion setting, and an arrangement setting (S20). As an example, it is assumed that a target original document thumbnail image is selected from the original document thumbnail image group by a user. Thereby, target original document data is selected. An original document data ID for identifying the original document data selected by the user is transmitted from the terminal device 12 through the communication channel N to the design creating apparatus 10.

Next, the recommended data providing unit 84 acquires a completion setting data group associated with the original document data selected by the user and an arrangement setting data group associated with the completion setting data from the recommended data memory 82 as recommended data, and provides a thumbnail image group of the recommended data (completion setting data and arrangement setting data) to the terminal device 12 (S21). Thereby, data of the thumbnail image group is transmitted to the terminal device 12 through the communication channel N, and a thumbnail image group of completion setting data as recommended data (completion state thumbnail image group) and a thumbnail image group of arrangement setting data as recommended data (arrangement region thumbnail image group) are displayed on the terminal device 12. These groups are displayed as candidates.

Next, completion setting data and arrangement setting data are selected by a user in the terminal device 12 (S22). For example, it is assumed that a target completion thumbnail image is selected from the completion state thumbnail image group displayed on the terminal device 12 by the user. Thereby, target completion setting data is selected. When the completion setting data is selected by the user, arrangement setting data which is associated with the completion setting data selected by the user is permitted to be selected in the terminal device 12, and arrangement setting data which is not associated with the completion setting data selected by the user is prohibited from being selected. Thereby, arrangement setting data defining an arrangement region which is not appropriate to original document data and completion setting data which are selected in advance is prevented from being selected by the user. Next, a target arrangement region thumbnail image is selected from an arrangement region thumbnail image group for which selection is permitted is selected by the user. Thereby, target arrangement setting data is selected. A completion setting ID for identifying the completion setting data selected by the user and an arrangement setting ID for identifying the arrangement setting data are transmitted from the terminal device 12 through the communication channel N to the design creating apparatus 10A.

In the design creating apparatus 10A, the processing unit 26 processes original document data selected by the user in accordance with the completion setting data selected by the user, to thereby create completion data (S23). The creating process is the same as that in the above-described exemplary embodiment, and thus a description thereof will not be repeated here.

Next, the printing data creating unit 28 disposes a processed original document indicated by the completion data in an arrangement region in accordance with the arrangement setting data selected by the user, to thereby create printing data (S24). The creating process is the same as that in the above-described exemplary embodiment, and thus a description thereof will not be repeated here. Similarly to the above-described exemplary embodiment, printing data is printed by a printing device, and postprocessing is performed by a post-processing device, thereby creating a final printed matter.

As described above, in the modification example, completion setting data within a processing limitation and arrangement setting data within an arrangement limitation are associated with original document data, and the pieces of data which are associated with each other are provided to a user as recommended data. Completion data and printing data are created using data selected from the recommended data by a user. Therefore, effort to select data is saved as compared to a case where a user randomly selects data among all pieces of data including an original document data group, a completion setting data group, and an arrangement setting data group.

Meanwhile, in the above-described example, original document data is selected by a user in step S20, either completion setting data or arrangement setting data may be selected by a user. For example, in a case where the completion setting data is selected by a user, an original document data group and an arrangement setting data group which are associated with the completion setting data are extracted, and pieces of data are selected from the original document data group and the arrangement setting data group by the user, thereby creating printing data using the pieces of data. The same is true of a case where arrangement setting data is first selected by a user.

Next, an updating timing of recommended data will be described. For example, when at least one of new original document data, new completion setting data, and new arrangement setting data is registered in the design creating apparatus 10A, recommended data is updated. In addition, when at least one of processing limitation information and arrangement limitation information is changed, recommended data is updated. For example, new completion setting data or arrangement setting data may be registered after original document data is registered in the design creating apparatus 10A, and recommended data is automatically updated in this case.

Hereinafter, a process in a case where new original document data is registered in the design creating apparatus 10A will be described. First, the recommended data providing unit 84 acquires processing limitation information from the limitation information memory 24. The recommended data providing unit 84 calculates a ratio of a size of an original document indicated by new original document data to a completion size of an original document indicated by completion setting data for each completion setting data which is registered in advance, and extracts completion setting data in which the ratio falls within a limitation regarding a ratio of a size which is defined by the processing limitation information, as a candidate. Further, in a case where a limitation regarding an object such as the amount of change in the position of the object is defined by processing limitation information, the recommended data providing unit 84 processes new original document data using completion setting data as a candidate. In a case where an object moves by the processing, the recommended data providing unit 84 extracts completion setting data in which the amount of movement falls within a limitation. In a case where the color of an object changes by the processing, the recommended data providing unit 84 extracts completion setting data in which the amount of change falls within a limitation. The recommended data providing unit 84 stores the extracted completion setting data in the recommended data memory 82 in association with new original document data. The same is true of arrangement setting data, arrangement setting data falling within an arrangement limitation is associated with new original document data and is stored in the recommended data memory 82. The same is true of a case where new completion setting data or new arrangement setting data is registered.

The above-mentioned design creating apparatuses 10 and 10A are realized by cooperation of a hardware resource and software, as an example. Specifically, the design creating apparatuses 10 and 10A include a processor such as a CPU which is not shown in the drawing. The processor reads out and executes a program stored in a storage device not shown in the drawing, thereby realizing functions of respective units of the design creating apparatuses 10 and 10A. The program is stored in the storage device through a recording medium such as a CD or a DVD or through a communication channel such as a network. Alternatively, the units of the design creating apparatuses 10 and 10A may be realized by, for example, a hardware resource such as a processor or an electronic circuit. A device such as a memory may be used for the realization. As another example, the units of the design creating apparatus 10 may be realized by a digital signal processor (DSP), a field programmable gate array (FPGA), or the like.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising a processor configured to:

receive original document data defining a design of an original document;

process the original document data to conform to a completion state of the original document during output by changing a position of an object constituting the original document data to be within a region surrounded by a cutout line; and in a case where (i) an amount of the processing of the original document data falls within a processing limitation and (ii) a ratio of a region of the original document based on the processed data to an arrangement region on a recording medium falls within an arrangement limitation, create output data in which the original document based on the processed data is disposed in the arrangement region on the recording medium.

2. The information processing apparatus according to claim 1,
wherein the original document data is constituted by a plurality of objects, and
the processor processes the plurality of objects to conform to the completion state.

3. The information processing apparatus according to claim 2, wherein the completion state is also at least one of a size of the original document during output, a color of the original document during output, and a folding position of the recording medium.

4. The information processing apparatus according to claim 3, wherein:
the processor changes a first size of the original document based on the original data to a second size of the original document to conform to the size of the original document during output,
the processing limitation is a ratio of the first size to the second size, and
in a case where the ratio is equal to or less than a ratio threshold value, the processor disposes the original document based on the processed data in the arrangement region to thereby create the output data.

5. The information processing apparatus according to claim 3, wherein:
the processing limitation is an amount of change in the position of the object, and
in a case where the amount of change in position is equal to or less than a position change amount threshold value, the processor disposes the original document based on the processed data in the arrangement region to thereby create the output data.

6. The information processing apparatus according to claim 3, wherein:
the processor changes a color of the object constituting the original document data to conform to the color of the original document during output,
the processing limitation is an amount of change in the color of the object, and
in a case where the amount of change in color is equal to or less than a color change amount threshold value, the processor disposes the original document based on the processed data in the arrangement region to thereby create the output data.

7. The information processing apparatus according to claim 6, wherein the processor changes the color of the object having a specific color to a color different from the specific color.

8. The information processing apparatus according to claim 7, wherein in a case where a color of the object on the cutout line is equivalent to the specific color, the processor changes the color of the object to another color.

9. The information processing apparatus according to claim 3, wherein:
the processor changes the position of the object constituting the original document data to avoid the folding position of the recording medium,
the processing limitation is an amount of change in the position of the object, and
in a case where the amount of change in position is equal to or less than a position change amount threshold value, the processor disposes the original document based on the processed data in the arrangement region to thereby create the output data.

10. The information processing apparatus according to claim 1, further comprising a memory that stores, as a combination, (i) the original document data, (ii) data indicating the completion state satisfying the processing limitation with respect to the original document data, and (iii) data indicating the arrangement region satisfying the arrangement limitation with respect to the original document data processed to conform to the completion state satisfying the processing limitation, for each original document data in association with each other,
wherein in a case where one of the original document data, the data indicating the completion state, and the data indicating the arrangement region is selected, the processor processes the original document data included in the combination in accordance with the data indicating the completion state which is included in the combination including the selected data, and the processor disposes the original document based on the processed data in the arrangement region to thereby create the output data in accordance with the data indicating the arrangement region which is included in the combination.

11. An information processing method, performed by a processor, and comprising:
receiving original document data defining a design of an original document;
processing the original document data to conform to a completion state of the original document during output by changing a position of an object constituting the original document data to be within a region surrounded by a cutout line; and
in a case where (i) an amount of the processing of the original document data falls within a processing limitation and (ii) a ratio of a region of the original document based on the processed data to an arrangement region on a recording medium falls within an arrangement limitation, creating output data in which the original document based on the processed data is disposed in the arrangement region on the recording medium.

12. A non-transitory computer readable medium storing a program causing a computer to execute an information processing process, the information processing process comprising:
receiving original document data defining a design of an original document;
processing the original document data to conform to a completion state of the original document during output by changing a position of an object constituting the original document data to be within a region surrounded by a cutout line; and
in a case where (i) an amount of the processing of the original document data falls within a processing limitation and (ii) a ratio of a region of the original document based on the processed data to an arrangement region on a recording medium falls within an arrangement limitation, creating output data in which the original document based on the processed data is disposed in the arrangement region on the recording medium.

* * * * *